Dec. 24, 1957  R. C. MATHISEN  2,817,541
AUXILIARY TRAILER COUPLING
Filed May 19, 1955  2 Sheets-Sheet 1
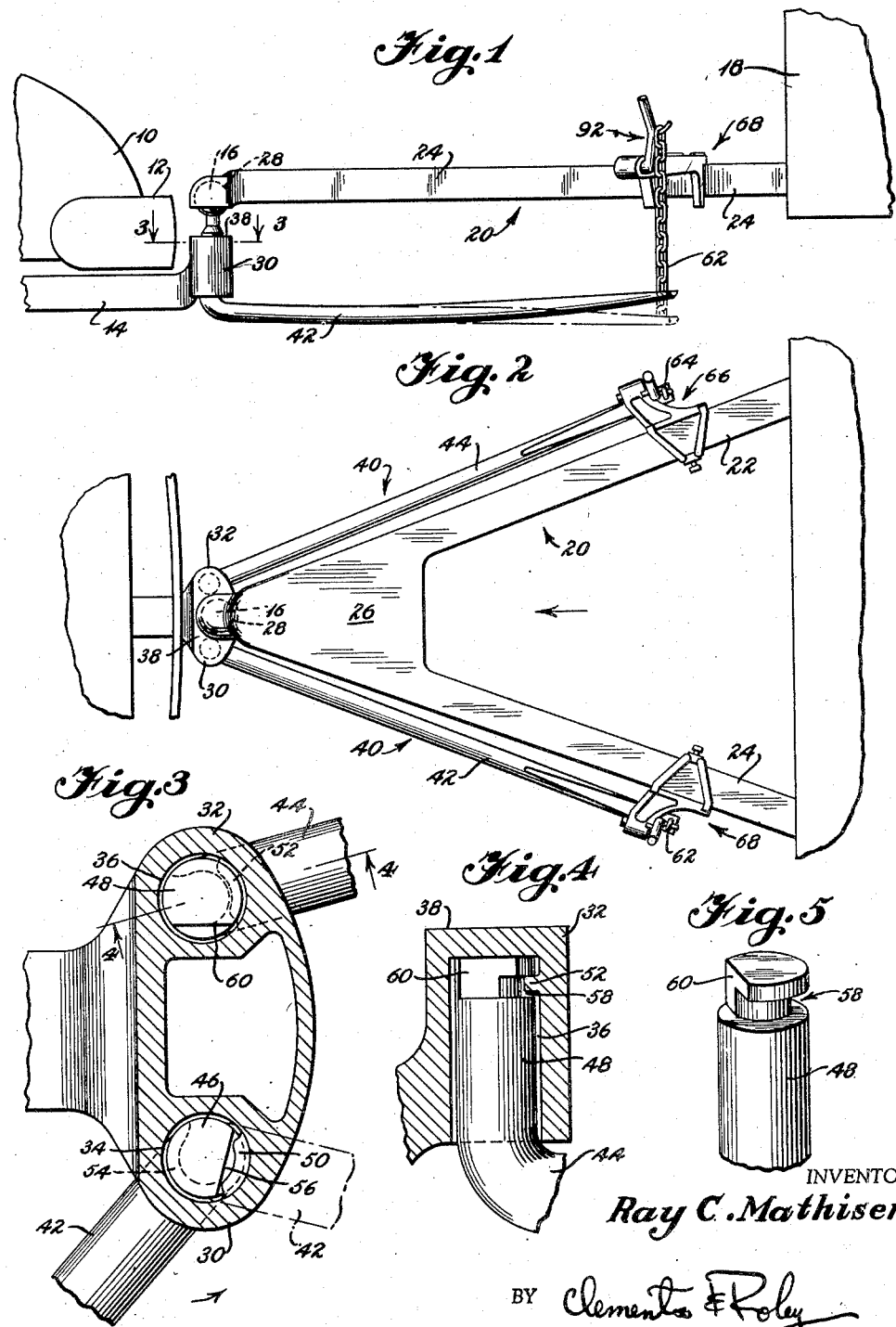
INVENTOR
Ray C. Mathisen
BY Clements & Roley
ATTORNEYS Dec. 24, 1957 R. C. MATHISEN 2,817,541
AUXILIARY TRAILER COUPLING
Filed May 19, 1955 2 Sheets-Sheet 2
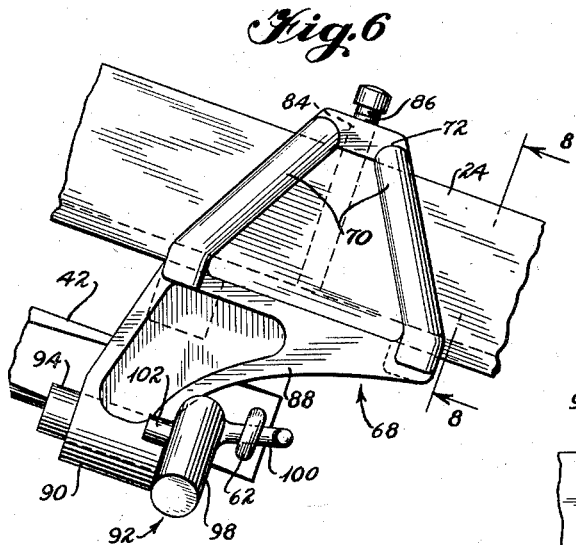
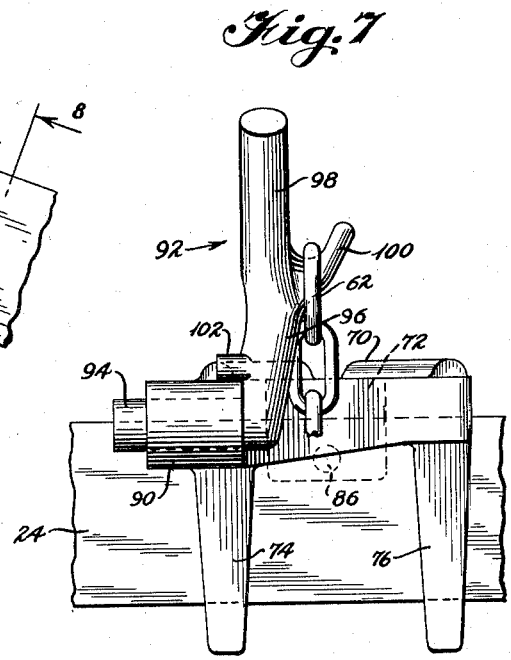
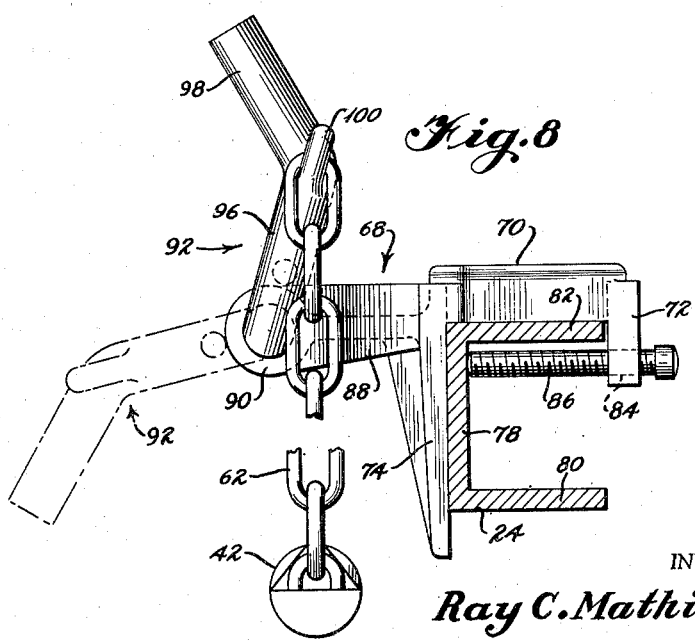
INVENTOR
Ray C. Mathisen
BY
ATTORNEYS 
United States Patent Office 2,817,541
Patented Dec. 24, 1957

2,817,541

AUXILIARY TRAILER COUPLING

Ray Cecil Mathisen, Burbank, Calif., assignor to Eaz-Lift Spring Corporation, Burbank, Calif.

Application May 19, 1955, Serial No. 509,513

10 Claims. (Cl. 280—406)

This invention relates to an auxiliary trailer coupling and more particularly to a safety load equalizing and draft stabilizing coupling device for automobile towed trailers.

This invention constitutes an improvement over the device shown and claimed in the prior Patent No. 2,597,657, issued May 20, 1952, to Martin H. Mathisen.

When the wheels of a trailer are disposed rearwardly of the center of the load, which is generally the case, the unbalanced weight is transferred through a sagging articulated draw bar connection to exert downward pressure on the extreme rear end of the automobile frame. The result is to greatly overload the rear wheels of the automobile and correspondingly reduce the weight on the front wheels.

An object of this invention is, therefore, to provide a readily operable, quick detachable draft coupling including the usual ball and socket connection and a resilient and self-tensioning draft and auxiliary supporting means operatively associated therewith. With this arrangement the draft end of a two-wheel trailer may be quickly and readily aligned with the frame of a towing automobile without the aid of accessories or dollies.

A further object of the invention is to provide an auxiliary tensioning and supporting draft means which is readily locked securely in operating position.

Another object is to provide an auxiliary tensioning and supporting draft means which may be readily moved to tensioning and supporting position.

These and other objects will appear in connection with the following specification which taken with the accompanying drawing constitutes a disclosure of my invention.

In the drawings:

Fig. 1 is a side view of my attachment in operative position;

Fig. 2 is a plan view of my attachment as shown in Fig. 1;

Fig. 3 is a fragmentary section substantially on the line 3—3 of Fig. 1 looking in the direction of the arrows;

Fig. 4 is a fragmentary section on the line 4—4 of Fig. 3, looking in the direction of the arrows;

Fig. 5 is a fragmentary perspective view of a portion of Fig. 4;

Fig. 6 is a partial plan view of a portion of Fig. 2 on an enlarged scale;

Fig. 7 is a side elevation of the device shown in Fig. 6, and

Fig. 8 is a rear view of the parts shown in Fig. 6.

Throughout the drawings like characters of reference refer to like parts in the several views illustrated, and attention is now directed to Fig. 1 of the drawings wherein there is shown a portion of an automobile 10 having a bumper 12, a draw bar 14 and the trailer hitch having a ball 16. A trailer 18 having a towing bar or tongue 20 comprising an angular frame consisting of a pair of channel bars 22 and 24 each secured at one end to the trailer 18 and converging forwardly thereof and secured at the other end to a web 26. A socket 28 is provided at the forward end portion of the web 26 for engagement with the ball 16. The structure thus far described is conventional and is well known.

Attached to either side of draw bar 14, as by welding or the like, are two members 30 and 32 having cylindrical openings 34 and 36 respectively. The members 30 and 32 may also be made integral with the draw bar 14 and may have welded thereto or made integral therewith a cover 38 for the cylindrical openings 34—36 which may also support the ball member 16.

Spring bars 40 are provided for equalizing the load on the wheels of the automobile. In the present form the bars 40 include elongate members or arms 42 and 44, having angular upturned or L-shaped forward ends 46 and 48 respectively, note Figs. 3 and 4. The normal angle between the ends 46 and 48 and the corresponding arms 42 and 44 is somewhat greater than a right angle to insure that there will be a flexing or bending as from the dot-dash line to the full line position in Fig. 1. The spring bars 42, 44 are similar except that for the right and left sides, facing forward, certain parts are allochirally arranged.

Attention is directed to Figs. 3, 4 and 5 wherein the socket members 30 and 32 are provided with radially inwardly projecting lug members 50 and 52 respectively near the upper ends of the cylindrical openings 34 and 36. The lug members 50 and 52 extend radially only part way about the inner periphery of the cylinders. The L-shaped end member 46 has an annular groove 54 near the upper end, extending part way around the periphery, to accommodate the lug 50. A part of the upper end of the member 46 is slabbed off to the depth of the groove 54 to form a flat portion 56 to enable the insertion of the end member 46 into the cylindrical opening 34 and interfitting with the lug 50 and groove 54, as will be explained later.

The L-shaped end member 48 has a groove 58 similar to the groove 54 and a flat portion 60 similar to the flat portion 56.

The rear ends of spring stabilizing arms 42 and 44 have chains 62 and 64 attached respectively thereto by any suitable means such as by welding or by the use of suitable clamps.

The use of my improved stabilizing bars will now be explained in connection with my novel means for attaching and adjusting same. Attached to the bars 22 and 24 respectively are clips 66 and 68. As these clips are identical except for being right-and-left handed or mirror images of each other, only clip 68 will be described in detail.

Attention is now directed to Figs. 6, 7 and 8 wherein the clip 68 includes web members 70 having a lug 72 and depending arms 74 and 76. The webs 70 overlies the upper part of bar 24, which is shown as channel shaped having a bight 78 and side walls 80 and 82. The lug 72 is provided with a threaded opening 84 to accommodate a screw 86.

In applying the clip 68 to the bar 24, the webs 70 are placed on the side wall 82 and the arms 74, 76 lie along the bight 78. The screw 86 is then inserted in the opening 84 in the lug 72 and tightened against the bight 78 to hold the slip 68 securely in place. A bracket 88 is attached to the clip 68 and is provided with a pivot means 90 to accommodate a crank 92. The crank 92 is substantially L-shaped having a portion 94 rotatably mounted in the pivot means 90 and an upstanding or right angle portion 96 and a handle 98 making a slight angle with the axis of the portion 96. Near the upper end of the portion 96 is a hook member 100. Also on the portion 96, adjacent the pivot means 90, is a lug 102 disposed perpendicular to the member 96.

The operation of my improved stabilizing and tension adjusting means will now be described. It is to be assumed that the ball 16 and socket 28 connections have been engaged in the conventional manner which causes the rear of the automobile 10 to sag, a condition which is remedied by the use of the bars 40.

To install the bars 40, they are placed with their longitudinal axes substantially parallel to the bumper 12 of the automobile or transverse to the length of the automobile. The L-shaped ends 46 and 48 are then inserted in the cylindrical socket openings 34 and 36 respectively from below. In this position the flats 56 and 60 will face substantially rearwardly as shown by 56 in solid lines in Fig. 3. By rotating the member 42 counter-clockwise to the dot-dash line position of Fig. 3 and the member 44 clockwise to the position shown in Fig. 3, the lugs 50 and 52 will engage in the grooves 54 and 58 respectively to lock members 46 and 48 securely against accidental removal. The cranks 92 are turned to the dot-dash line position of Fig. 8 and a link, preferably the last link, of the chains 62 and 64 are slipped over the hooks 100. The crank 92 is then raised to the full line position of Fig. 8 in which the lug 102 engages the bracket 88 at a point somewhat to the right, as seen in Fig. 8, of the center line of the longitudinal axis of the portion 94, or rearwardly of the pivot means 90 with the arm 96 inclined slightly to the right. To increase the leverage in turning the crank 92, a section of pipe or heavy tubing may be slipped over the handle 98. This movement lifts the rear ends of the bars 42, 44 bending them slightly from the dot-dash line position to the full line position in Fig. 1, and causes the bars to exert, through the L-shaped end portions 46, 48, a lifting action on the rear end of automobile 10, and a substantial leveling of the tongue 20. The downward pull on the chains 62 on the hooks 100 causes the lugs 102 to firmly engage the brackets 88 and render accidental displacement quite unlikely.

It is to be understood that the bars 40 are resilient being preferably made of spring steel.

It is to be understood that while specific examples are given, they are not to be taken as limitations, and that such modifications as may occur to one skilled in the art may be used within the compass of the appended claims.

I claim:

1. An auxiliary automobile trailer hitch for use with a conventional articulated joint between an automobile and a trailer tongue comprising a pair of substantially vertical axis pivot means for attachment to an automobile adjacent the articulated joint at laterally opposite sides thereof, a pair of normally straight spring rods having angular end portions rotatably mounted in said pivot means for lateral pivotal movement of said rods, a pair of generally vertically disposed flexible suspension members having the corresponding ends thereof attached to the free ends of said rods, and means mounted on the trailer tongue above said rods engaged by said flexible suspension members for bending said spring rods, said means comprising a pair of clips fixed on the tongue, crank means rotatably mounted on each clip, stop means on the respective crank means limiting rotation thereof and means on the crank means for engaging the flexible suspension members said pivot means and said angular ends of said rods having cooperating means preventing axial displacement of the ends of said rods.

2. The structure of claim 1 in which the vertical axis pivot means comprises upright cylindrical socket members having radially inwardly extending lug means on the inner periphery thereof.

3. The structure of claim 2 in which the cooperating means on the spring bars consists of anular grooves near the ends of the angular end portions adapted to engage the lug means.

4. The structure of claim 3 in which the lug means and the groove are part annular and in which a portion of the ends above the groove is slabbed off forming a flat portion to pass the lug means.

5. The structure defined in claim 1, wherein the means on the crank means for engaging the flexible suspension members comprise a hook mounted on each crank means outwardly of the rotatable mounting means therefor.

6. The structure defined in claim 5, wherein the stop means comprises a lug mounted on each crank means and engageable with the respective clip to limit rotation of the crank.

7. The structure defined in claim 6, wherein the engagement of the stop means with the respective clip positions the hook in a vertical plane rearwardly of the rotatable mounting for the crank.

8. The structure defined in claim 7, wherein the flexible suspension members are chains.

9. A device for equalizing the load applied to the wheels of an automobile by a trailer articulately coupled thereto by means of a trailer tongue and a trailer hitch, said device comprising a pair of spring rods having angled ends and normally straight arms extending alongside the trailer tongue, socket means adjacent the trailer hitch having the angled ends rotatably mounted therein, said socket means and said angled ends having cooperating elements engageable upon partial rotation of said rods to retain the angled ends in the socket means, flexible means attached to the free ends of said rods, means tensioning said rods comprising cranks pivotally mounted on the trailer tongue, a hook on each crank outwardly of the pivotal mounting thereof engageable with the respective flexible means, stop means on said cranks limiting rotation in one direction, the positioning of the hooks and length of the flexible means being such that rotation of the cranks lifts the free ends of the rods to tension them, the stop means positioning the respective hook so that a line between each hook and the point of the attachment to the free end of the rod is rearwardly of the pivotal mounting.

10. An auxiliary automobile trailer coupling for use with a conventional articulated joint between an automobile trailer hitch and a trailer tongue, said coupling comprising a pivot means for attachment adjacent the articulated joint, a normally straight spring rod having an angular end portion rotatably mounted in said pivot means for pivotal movement of the outer free end of said rod, a flexible suspension member having an end portion thereof attached to the free end of said rod, means adapted to be mounted on a trailer tongue above said rod and in engagement with the opposite end portion of the flexible member for bending the rod, said means comprising a slip, a crank rotatably mounted on the clip, stop means on the crank limiting rotation thereof, and means on the crank for engaging said opposite end portion of the flexible suspension member, and cooperating locking elements on said pivot means and the angular end portion of said rod preventing the displacement of the end portion from said pivot means.

References Cited in the file of this patent

UNITED STATES PATENTS

| 271,143 | Smith | Jan. 23, 1883 |
| 892,076 | Olson | June 30, 1908 |
| 2,597,657 | Mathisen | May 20, 1952 |